US012667794B2

(12) United States Patent
Gilet

(10) Patent No.: US 12,667,794 B2
(45) Date of Patent: Jun. 30, 2026

(54) LIQUID CENTRIFUGAL SPRAYING DEVICE WITH FRICTIONLESS DYNAMIC SEALING

(71) Applicant: DEVEA SAS, Saint-Etienne de Montluc (FR)

(72) Inventor: Morgan Gilet, Caulnes (FR)

(73) Assignee: DEVEA SAS, Saint-Etienne de Montluc (FR)

( * ) Notice: Subject to any disclaimer, the term of this patent is extended or adjusted under 35 U.S.C. 154(b) by 264 days.

(21) Appl. No.: 18/588,590

(22) Filed: Feb. 27, 2024

(65) Prior Publication Data

US 2024/0286061 A1 Aug. 29, 2024

(30) Foreign Application Priority Data

Feb. 28, 2023 (FR) ........................................ 2301871

(51) Int. Cl.
B05B 15/50 (2018.01)
B01D 1/18 (2006.01)

(52) U.S. Cl.
CPC ................ B01D 1/18 (2013.01); B05B 15/50 (2018.02)

(58) Field of Classification Search
CPC ......... B01D 1/18; B05B 3/1007; B05B 15/50; B05B 3/1035; B05B 3/1085; B05B 3/105
USPC .......................................................... 239/224
See application file for complete search history.

(56) References Cited

U.S. PATENT DOCUMENTS

| | | | | | |
|---|---|---|---|---|---|
| 1,874,397 | A | * | 8/1932 | Webb | F16C 1/08 138/131 |
| 2,086,921 | A | * | 7/1937 | Norris | B05B 3/087 239/222 |
| 2,257,807 | A | * | 10/1941 | Morse | F24F 6/06 239/215 |
| 3,074,650 | A | * | 1/1963 | Kanarek | B05B 3/087 239/222 |
| 3,379,381 | A | * | 4/1968 | Decaux | B05B 11/1015 239/493 |
| 4,148,932 | A | * | 4/1979 | Tada | B05B 5/0407 239/3 |
| 4,235,377 | A | * | 11/1980 | Davis | B05B 9/0861 74/25 |

(Continued)

FOREIGN PATENT DOCUMENTS

| CN | 214917180 U | 11/2021 |
|---|---|---|
| FR | 2472954 A1 | 7/1981 |
| FR | 3055106 A1 | 2/2018 |

OTHER PUBLICATIONS

French Search Report and Written Opinion dated Jan. 18, 2024 for corresponding French Application No. 2301871, filed Feb. 28, 2023.

*Primary Examiner* — Chee-Chong Lee
(74) *Attorney, Agent, or Firm* — David D. Brush; Westman, Champlin & Koehler, P.A.

(57) ABSTRACT

A device for centrifugal spraying of a liquid product. The device includes a rotary electric motor movable in rotation about an axis and arranged in a concentric sleeve. The centrifugal spraying device is configured so as to be able to prevent penetration of liquid into the electric motor without resorting to static sealing members such as sealing gaskets or sealed ball bearings, by taking advantage of the fast rotation of the motor to create an air overpressure in the vicinity of the axis of rotation of the motor, resulting in directing all of the liquid so that it gets away from the axis of rotation of the motor.

7 Claims, 3 Drawing Sheets

(56)                  References Cited

U.S. PATENT DOCUMENTS 4,294,408 A * 10/1981 Snyder ...................... B05B 3/08
                                                       239/218.5
4,325,646 A * 4/1982 Sasaki ...................... B41J 32/02
                                                       400/208
4,392,614 A * 7/1983 Groth ...................... B05B 3/087
                                                       239/222

* cited by examiner

[Fig. 1]
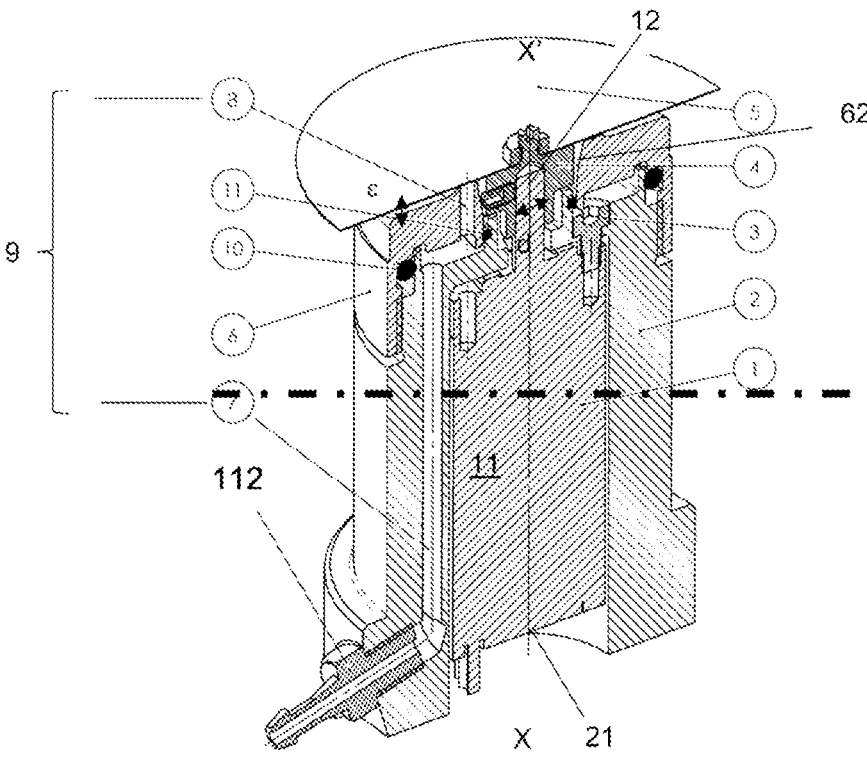
[Fig. 2]
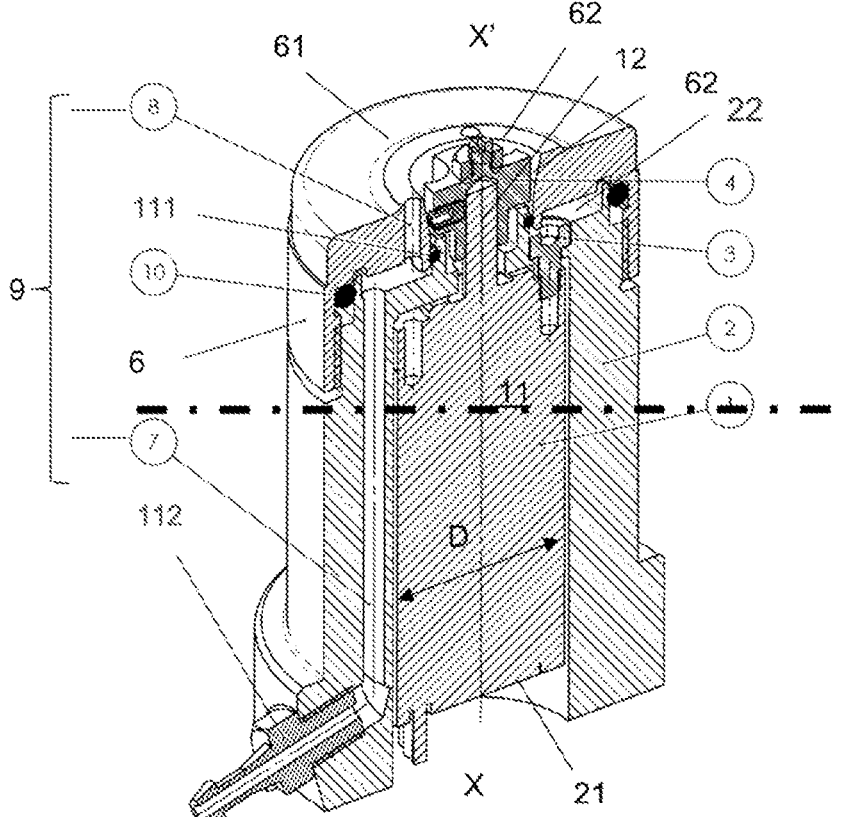

[Fig. 3]
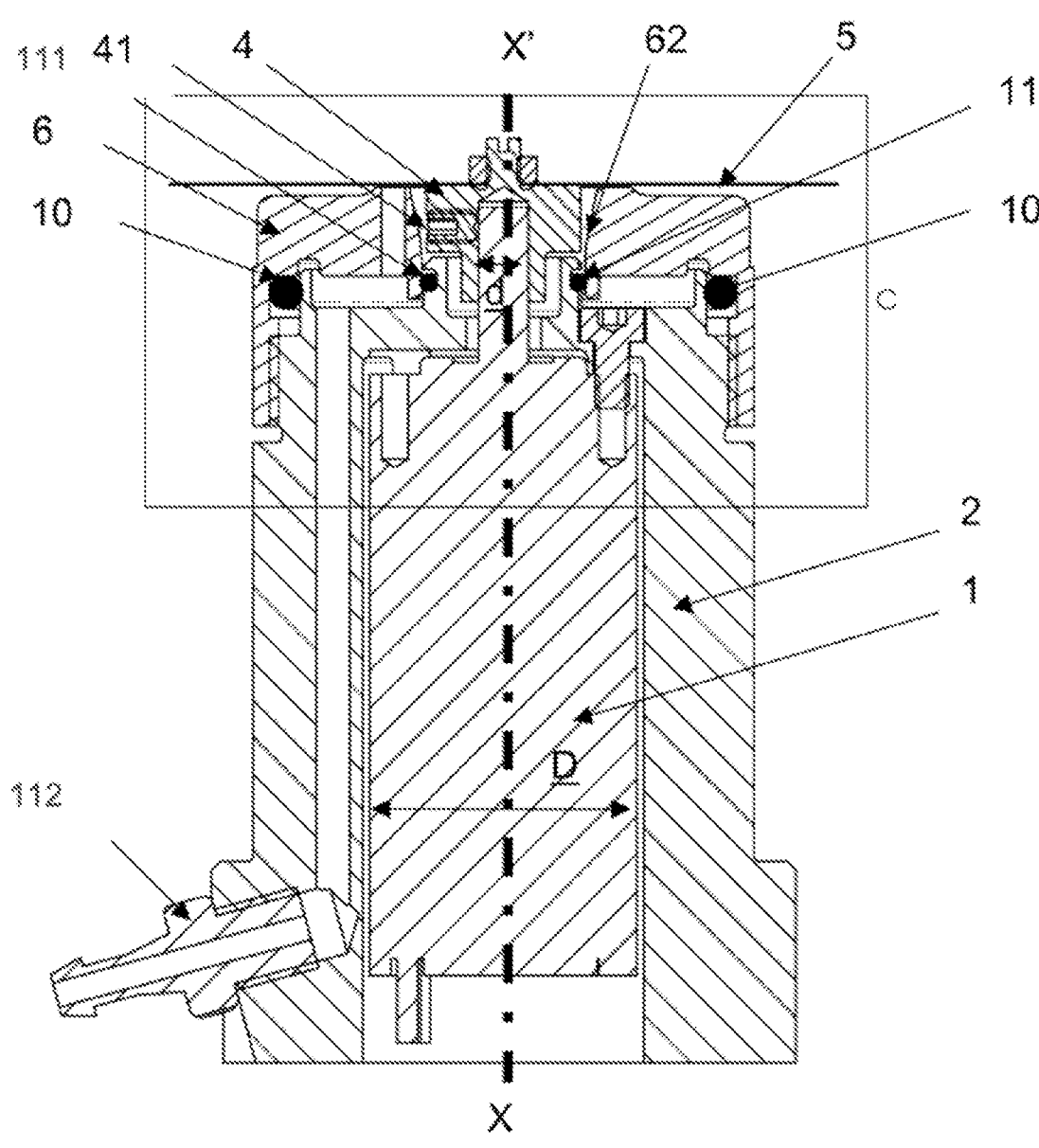

[Fig. 4]
[Fig. 5]
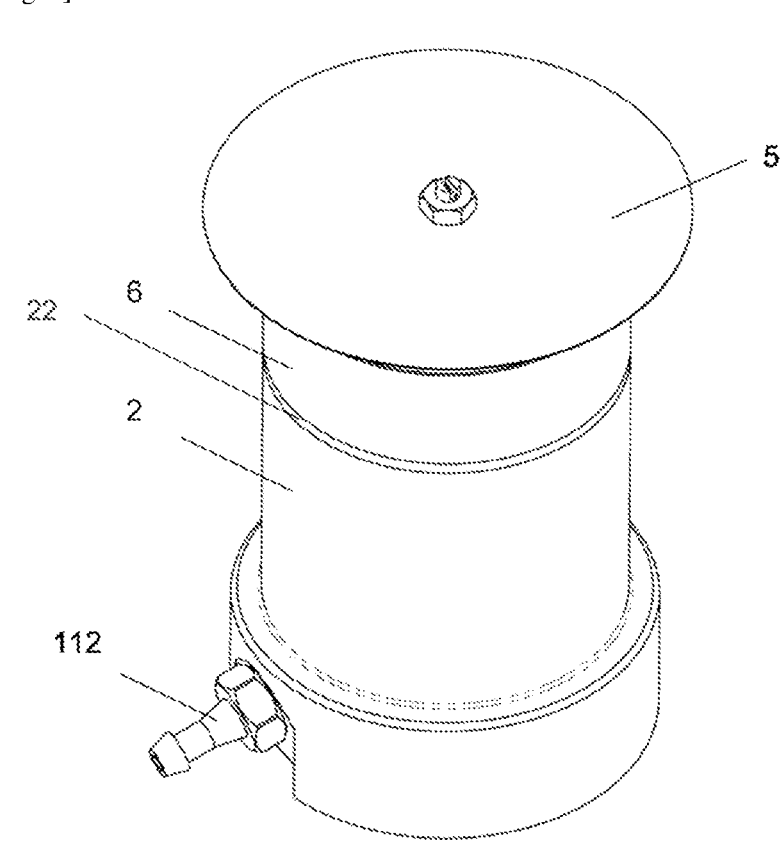

LIQUID CENTRIFUGAL SPRAYING DEVICE WITH FRICTIONLESS DYNAMIC SEALING

This Application claims priority to and the benefit of French Patent Application No. 2301871, filed Feb. 28, 2023, the content of which is incorporated herein by reference in its entirety.

TECHNICAL FIELD OF THE INVENTION

The present invention relates to the technical field of liquid centrifugal spraying devices. More particularly, the present invention relates to such devices wherein sealing is achieved in a dynamic manner.

TECHNICAL BACKGROUND

Currently, the liquid centrifugal spraying devices known to a person skilled in the art typically comprise a rotary electric motor movable in rotation about an axis and arranged in a concentric sleeve, a disc support mounted on the axis of the motor and a rotary disc with a small thickness fastened on this disc support. The motor allows setting the disc in rotation at a very high speed. In general, the sleeve is capped with a capsule whose upper face is very close to the lower face of the disc yet without being in contact with it. A network of pipes formed in the sleeve and the capsule so as to form a continuous and sealed network allows introducing the liquid to be sprayed into these spraying devices. The speed of the disc being very high, the liquid is split into a multitude of droplets with very small dimensions as soon as it comes into contact with the disc, and these droplets are then projected at high speed in all directions, in the plane of the disc.

In such liquid centrifugal spraying devices, while almost all of the liquid is sprayed, it happens that residual liquid volumes do not come into contact with the lower face of the rotary disc and flow towards the axis of the motor, thereby creating a risk of failure of mechanical, electrical or electronic components within the motor by corrosion or by inundation.

To overcome such a risk of failure, a common solution consists in placing a sealing gasket or a sealed ball bearing between the axis of the electric motor (rotating portion) and the bore of the sleeve (fixed portion) in order to confine any liquid residues upstream of the sensitive portions of the electric motor. However, the rotational speed of the electric motor being very high, the wear of these components is rapid, which implies frequent maintenance operations, and even a risk of premature failure.

DISCLOSURE OF THE INVENTION

In order to overcome the aforementioned drawbacks, the Applicant has a developed a device for centrifugal spraying of a liquid product allowing preventing the liquid from getting into the electric motor, without resorting to static sealing members such as sealing gaskets or sealed ball bearings, by taking advantage of the fast rotation of the motor to create an air overpressure in the vicinity of the axis of rotation of the motor, resulting in directing all of the liquid so that it gets away from the axis of rotation of the motor.

More particularly, the Applicant has developed a device for centrifugal spraying of a liquid product comprising:
- a rotary electric motor movable in rotation about an axis of rotation XX', said rotary electric motor comprising a rear portion with a diameter D and an axis of symmetry and a front portion with a diameter d arranged in the extension of said rear portion and with the same axis of symmetry, with d being smaller than D,
- a static chamber in the form of a sleeve arranged concentrically with said rotary electric motor with respect to said axis of rotation XX' and partially surrounding the rear portion of said rotary electric motor, said static chamber having a rear face and a front face, said static chamber including a first means for routing the liquid to be sprayed formed longitudinally so as to enable said liquid to flow from the rear face of the static chamber up to the front face of the static chamber,
- a support designed so as to be mounted concentrically on the front portion of said electric motor and on which are fastened
- an axisymmetric object such as a planar disc, preferably with a small thickness (in particular in the range of 0.1 to 1 mm), this disc being able to be driven in rotation at high speed by said rotary electric motor,
- a capsule nested concentrically on said front face of the static chamber, so that the upper face of said capsule is arranged just below said planar disc to avoid any contact with said planar disc, while being separated by a distance ε (preferably comprised between 0.05 mm and 0.5 mm), said capsule having an internal lateral face surrounding said support, said capsule including a second means for routing the liquid to be sprayed formed longitudinally to enable said liquid to flow from said front face of the static chamber up to the face of said planar disc located opposite the upper face of said capsule, said first and second routing means, said capsule and said static chamber being arranged in said centrifugal spraying device so that said first and second routing means are in fluidic communication and forms a continuous network enabling routing of the liquid to be sprayed from the rear face of the static chamber up to the face of said planar disc located opposite the upper face of said capsule, the spraying device according to the invention being characterised in that it further comprises blind orifices formed radially in said support and extending radially towards the axis XX', and in that said internal face of said capsule is shaped as a divergent nozzle the section of which perpendicularly to the axis XX' has a diameter increasing up to the level of the upper face of the capsule.

Advantageously, the electric motor may be mounted in the sleeve by means of several screws.

As routing means (first and second routing means), pipes, and in particular cylindrical pipes, will advantageously be used.

As regards the blind orifices formed radially in the support (in particular by machining or moulding, or any other forming means suited to this technology), they allow creating air pockets. Preferably, they may be in the form of turbine vanes or cylinders.

The combination of the presence of the blind orifices formed radially in the support and the internal face of the capsule in the form of divergent nozzle result in that, when the motor is rotating at high speed, the air contained in the blind orifices formed in the support undergoes a centrifugal force, thereby creating an air pressure gradient, with an air overpressure outside the blind orifices (or pockets) and an air depression close to the axis of rotation. The combination of the geometry of the nozzle and of this air pressure gradient induces an air stream in the forward direction, where the diameter of the bore is larger. The channels promoting the circulation of air around the motor enable the stable establishment of this air stream, so that it resists any liquid flows in the direction of the axis of the motor while diverting them outwards, thereby guaranteeing contact of all of the liquid with the lower face of the rotary disc and consequently spraying and ejection thereof.

Advantageously, the continuous network enabling routing of the liquid to be sprayed may be sealed using O-ring gaskets arranged respectively between the capsule and the static chamber, as well as between the rotary electric motor and the support.

Advantageously, the device according to the invention may further comprise a connector for introducing the liquid to be sprayed into the device according to the invention, this connector being arranged on the rear face of the static chamber so as to be in fluidic communication with the continuous network. The liquid to be sprayed which is thus introduced into the device via the connector can be set in movement using a pump (not illustrated), before being conveyed through the pipe network until coming into contact with the lower face of the disc.

Advantageously, the device according to the invention may further comprise a high flow rate blower arranged under the device according to the invention. By creating a powerful air stream, it allows diverting the trajectory of the droplets in a direction parallel to the axis of rotation of the disc.

Advantageously, the device according to the invention may further comprise a tachymeter adapted to monitor the rotational speed of the motor, so as to avoid the liquid to be sprayed getting into the device according to the invention when the disc rotates at rated speed.

Other advantages and particularities of the present invention will arise from the following description, given as a non-limiting example and made with reference to the following figures and examples.

BRIEF DESCRIPTION OF THE FIGURES

The following examples illustrate the invention, in connection with the figures discussed hereinabove, yet without limiting the scope thereof:

FIG. 1 is a schematic perspective illustration showing the cross-section of an example of a centrifugal spraying device according to the invention (the internal portions of the device being illustrated in the section and the external portions in perspective);

FIG. 2 is also a schematic perspective illustration showing the cross-section of the centrifugal spraying device shown in FIG. 1, yet without the rotary planar disc;

FIG. 3 is a schematic cross-sectional illustration of the centrifugal spraying device shown in FIG. 1 (with the rotary planar disc);

FIG. 4 is a detail view of FIG. 3 showing more specifically nesting of the capsule 6 on the sleeve 2 and the internal face of the nozzle-shaped capsule; and FIG. 5 is a schematic illustration in complete perspective of the centrifugal spraying device.

DETAILED DESCRIPTION OF THE INVENTION

FIGS. 1 to 4 schematically illustrate an example of a centrifugal spraying device according to the invention 1 comprising:

a rotary electric motor 1 movable in rotation about an axis of rotation XX' and comprising a rear portion 11 with a diameter D and an axis of symmetry XX' and a front portion 12 with a diameter d arranged in the extension of the rear portion 11 and with the same axis of symmetry XX', with d being smaller than D (D and d visible in FIGS. 3 and 4), the rotary electric motor 1 being mounted by means of screws 3 in a sleeve 2 having a rear face 21 and a front face 22, the sleeve 2 being arranged concentrically with the rotary electric motor 1 with respect to the axis of rotation XX', so as to partially surround the rear portion 11 of the motor 1, the sleeve 2 including a first pipe 7 formed longitudinally to enable the liquid to flow from its rear face 21 up to its front face 22, a support 4 (or disc support) designed so as to be mounted concentrically on the front portion 12 of the electric motor 1 and on which are fastened a planar disc 5 with a small thickness (visible only in FIGS. 1 and 3), able to be driven in rotation at high speed by the rotary electric motor 1, a capsule 6 nested concentrically on said front face 22 of the sleeve 2, so that its upper face 61 (visible only in FIG. 2) is arranged just below the planar disc 5 to avoid any contact with the planar disc 5, while being separated by a distance ε, 1 the capsule 6 having an internal lateral face 62 (visible in FIGS. 3 and 4) surrounding said support 4, the capsule 6 including a second pipe 8 formed longitudinally to enable the liquid to flow from the front face 22 of the sleeve 2 up to the face of the planar disc 5 located opposite the upper face of said capsule 6, the pipes 7, 8, the capsule 6 and the sleeve 2 being arranged so that the pipes 7, 8 are in fluidic communication and forms a continuous network 9 enabling routing of the liquid to be sprayed from the rear face 21 of the sleeve 2 up to the face of the planar disc 5 located opposite the upper face of the capsule 6, this internal face 62 being shaped as a divergent nozzle whose section perpendicularly to the axis XX' has a diameter increasing up to the level of the upper face 61 of the capsule 6, and finally blind orifices 41 (visible in FIGS. 3 and 4) in the form of channels, in particular cylindrical formed radially in the support 4 and extending radially towards the axis XX'.

Moreover, FIGS. 1 to 4 show that the device 1 according to the invention further comprises O-ring gaskets (static gaskets) 10 and 111 arranged respectively between capsule 6 and the sleeve 2 (gasket 10), and between the motor 1 and the support 4 (gasket 111), to seal the continuous network 9 enabling routing of the liquid to be sprayed in the device 1 according to the invention.

In particular, FIG. 5 shows that the device according to the invention may further comprise a connector 112 to introduce the liquid to be sprayed, this connector 112 in fluidic communication with the continuous network 9 being arranged on the rear face 22 of the sleeve 2.

EXAMPLES

Example 1 (Comparative)

Over the period between 2020 and 2022, the Applicant has been able to sell or replace (curative maintenance operations) fifth motors per year on average on different machines. These machines were equipped with one or two diffusion heads in accordance with the prior art: in this instance, these diffusion heads in accordance with the prior art comprise a rotary electric motor movable in rotation about an axis and arranged in a concentric sleeve, a disc support mounted on the axis of the motor and a rotary disc with a small thickness fastened on this disc support. The sleeve is capped with a capsule whose upper face is very close to the lower face of the disc yet without being in contact with it. A network of channels formed in the sleeve and the capsule so as to form a continuous and sealed network allows introducing the liquid to be sprayed in these spraying devices. Unlike the spraying device according to the invention, there are no blind orifices formed radially in the support, and the internal face of the capsule is not shaped as a divergent nozzle, but a sealing gasket or a sealed ball bearing between the axis of the electric motor and the bore of the sleeve. With such motors, a high problem rate has been noticed, in this instance a corrosion generated by the penetration of liquid along the rotor forming the primary source of deterioration of the motors and therefore of replacement thereof.

Example 2 (According to the Invention): Water Centrifugal Spraying

The centrifugal spraying device in accordance with the present invention and as shown in FIGS. 1 to 5 has been tested on a disinfectant product standard diffuser, the common device (with static sealing) having been replaced by a prototype of the invention, in a barely constraining environment: a warehouse with an 8 m ceiling height and using water as a liquid to be sprayed, so that the environment was neither saturated (significant dispersion effect over the entirety of the volume of the warehouse) nor exposed to chemical products (tests with water). The tests consisted in verifying that the liquid does not get in upstream of the axis of the motor. The tests have been carried out over a duration of about 6 months, corresponding to sixty operating hours of the machine. Upon completion of this testing phase, the following facts have been noticed:

no degradation of the motor, which allows confirming the effectiveness of the sealing process, the consumption of the motor at the rated rotational speed has not increased compared to that one which would have been obtained using a static sealing system, which means an absence of degradation of the efficiency that could be related to a degradation, finally, the visual inspection of the motor shows the absence of liquid or corrosion traces upstream of the motor axis.

Example 3 (According to the Invention): Centrifugal Spraying of Hydrogen Peroxide The same example as in Example 1 has been used to operate under normal conditions usually encountered in the activity sectors in which the company intervenes. This device has been installed in a 31 m³ room with a 2.5 m ceiling height. The disinfection operations have been done according to the protocols commonly proposed by the company: vaporisation of hydrogen peroxide and validation of the decontamination performance by means of biological indicators. 15 successive tests have been conducted allowing validating that the obtained results in terms of decontamination were compliant with the expectations and that the motor of the machine has undergone no degradation upon completion of all of the testing operations.

REFERENCES

1: rotary electric motor
11: rear portion of the rotary electric motor
12: front portion of the rotary electric motor
2: a static chamber
21: rear face
22: front face
3: screw for fastening the motor 1 in the static chamber (only description)
4: a disc-plane support
5: disc-plane
6: capsule
61: upper face
62: nozzle-shaped internal lateral face
7: first means for routing the liquid to be sprayed
8: second means for routing the liquid to be sprayed
9: continuous network comprising the first and second routing means 7, 8,
10: O-ring gasket between the capsule 6 and the static chamber 2
111: O-ring gasket between the rotary electric motor 1 and the support 4.
112: connector.

Although the present disclosure has been described with reference to one or more examples, workers skilled in the art will recognize that changes may be made in form and detail without departing from the scope of the disclosure and/or the appended claims.

The invention claimed is:

1. A device for centrifugal spraying of a liquid product comprising:

a rotary electric motor movable in rotation about an axis of rotation, said rotary electric motor comprising a rear portion with a diameter D and an axis of symmetry and a front portion with a diameter d arranged in an extension of said rear portion and with the same axis of symmetry, with d being smaller than D, a static chamber in the form of a sleeve arranged concentrically with said rotary electric motor with respect to said axis of rotation and partially surrounding the rear portion of said rotary electric motor, said static chamber having a rear face and a front face, said static chamber including a first liquid route for routing the liquid to be sprayed formed longitudinally so as to enable said liquid to flow from the rear face of the static chamber up to the front face of the static chamber, a support mounted concentrically on the front portion of said electric motor and on which are fastened, an axisymmetric object, able to be driven in rotation at high speed by said rotary electric motor, a capsule nested concentrically on said front face of said static chamber, so that an upper face of said capsule is arranged just below said axisymmetric object to avoid any contact with said axisymmetric object, while being separated by a distance ε, said capsule having an internal lateral face surrounding said support, said capsule including a second liquid route for routing the liquid to be sprayed formed longitudinally to enable said liquid to flow from said front face of the static chamber up to a face of said axisymmetric object located opposite the upper face of said capsule, said first and second liquid routes, said capsule and said static chamber being arranged in said centrifugal spraying device so that said first and second liquid routes are in fluidic communication and form a continuous network enabling routing of the liquid to be sprayed from the rear face of the static chamber up to the face of said axisymmetric object located opposite the upper face of said capsule, and blind orifices formed radially in said support and extending radially towards the axis of rotation, and wherein said internal lateral face of said capsule has a shape of a divergent nozzle, the shape of the divergent nozzle having a cross-section perpendicular to the axis of rotation, and wherein the cross-section has a diameter that increases up to a level of the upper face of the capsule.

2. The device according to claim 1, according to which said continuous network enabling routing of the liquid to be sprayed is sealed using O-ring gaskets arranged respectively between said capsule and said static chamber and between said rotary electric motor and said support.

3. The device according to claim 1, further comprising a connector positioned to introduce the liquid to be sprayed in said device, said connector being arranged on the rear face of said static chamber and in fluidic communication with said continuous network.

4. The device according to claim 1, according to which the distance & between the upper face of said capsule and said axisymmetric object is between 0.05 mm and 0.5 mm.

5. The device according to claim 1, according to which said blind orifices formed radially in said support are in the form of turbine vanes or cylinders.

6. The device according to claim 1, further comprising a tachymeter adapted to control a rotational speed of the motor.

7. The device according to claim 1, wherein the axisymmetric object comprises a planar disc.

* * * * *